Nov. 17, 1925.　　　　　　　　　　　1,561,984
P. KIER
ATTACHMENT FOR TEST RECEPTACLES
Filed April 30, 1924
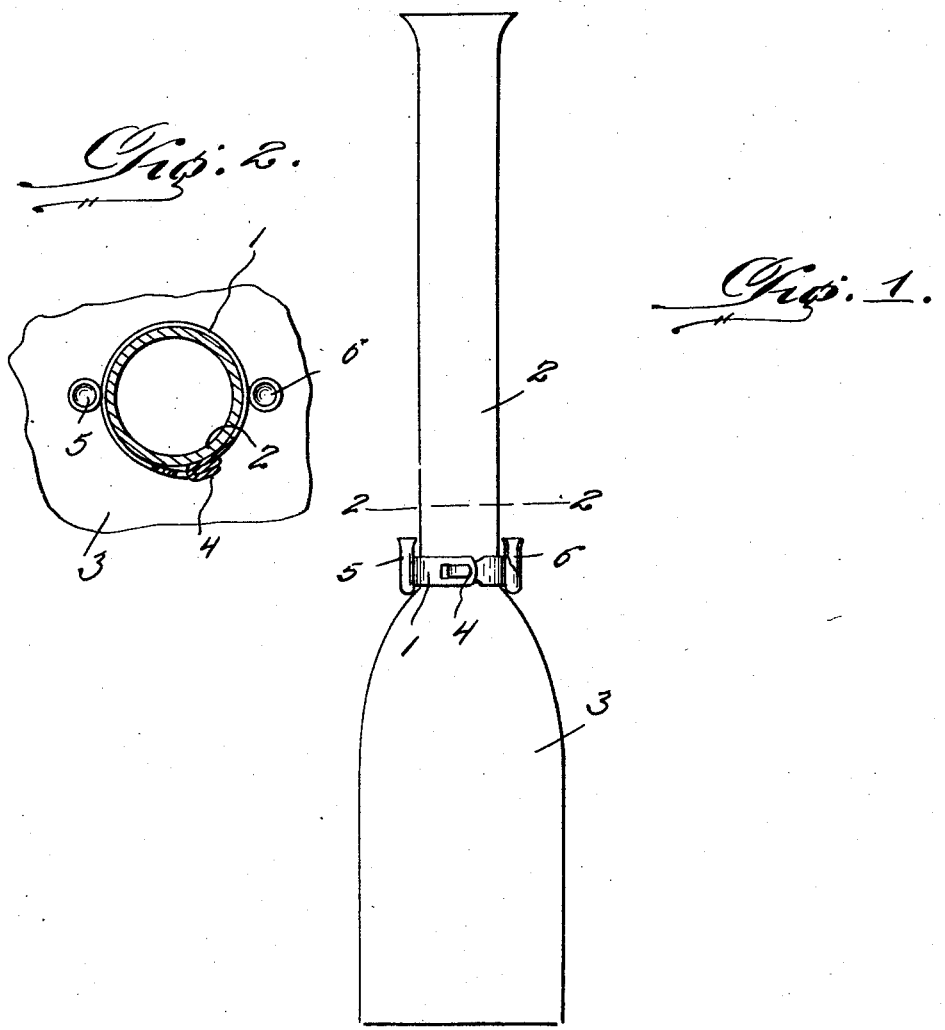
Perry Kier,
Inventor
By Clarence A. O'Brien
Attorney Patented Nov. 17, 1925.

1,561,984

UNITED STATES PATENT OFFICE.

PERRY KIER, OF MANKATO, KANSAS.

ATTACHMENT FOR TEST RECEPTACLES.

Application filed April 30, 1924. Serial No. 710,076.

*To all whom it may concern:*

Be it known that I, PERRY KIER, a citizen of the United States, residing at Mankato, in the county of Jewell and State of Kansas, have invented certain new and useful Improvements in an Attachment for Test Repectacles, of which the following is a specification.

This invention relates to new and useful improvements in attachments for test receptacles and has for its principal object to provide a means for varying the weight of the receptacle in order that a standard weight for the same may be obtained.

One of the important objects of the present invention is to provide an attachment of the above mentioned character, which is of such a construction as to enable the same to be readily and easily placed in position thereon, the attachment being further of such a construction as to enable the weight of the test receptacle upon which the same is placed to be brought up to a predetermined or required weight.

A still further object of the invention is to provide an attachment of the above mentioned character, which is of such a construction as to enable additional weight to be added as is required or to lessen the weight in order that the receptacle may reach the desired standard.

A still further object of the invention is to provide an attachment of the above mentioned character, which is simple in construction, inexpensive, strong and durable and furthermore adapted for the purposes for which it is designated.

Other objects and advantages of this invention will become apparent during the course of the following description.

In the accompanying drawing forming part of this specification and in which like numerals designate like parts throughout the same:

Figure 1 is a side elevation of a test receptacle showing my attachment in position thereon, and Figure 2 is an enlarged transverse section taken on line 2—2 of Figure 1.

In testing milk, cream, or the like, the test bottles oftentimes vary in their weight and in order to accurately ascertain the exact weight of the contents placed within the test receptacle, the test receptacle which is used must balance the scales and reach a predetermined standard before the tare can be accurately determined.

In order to acquire or maintain a standard weight of the test receptacle, I provide an attachment which is adapted to be placed around the neck of the receptacle and the same provides a means for varying the weight of the receptacle to bring the receptacle up to a predetermined or given standard weight.

My attachment comprises a band 1 which is formed of any suitable material, either lead or pewter which is adapted to encircle the neck 2 of the test receptacle 3 in the manner shown in Figure 1 of the drawing and the free ends of the band are interlocked as shown at 4 for holding the band in position on the neck of the test receptacle. Arranged at diametrically opposite points on the band are the pockets 5 and 6 respectively which have their upper portions open and are also formed of substantially the same material as the band.

The purpose of the pockets 5 and 6 is to provide a means for reeciving fine shot or the like when additional weight is required and after the proper amount of shot has been placed in the pockets the free open ends may be closed by any suitable means to prevent the displacement of the shot therefrom. If the test receptacle upon which the attachment is placed is above the predetermined standard or weight, the band may be trimmed down to such an extent as may be desired.

It will thus be seen from the foregoing description, that an attachment for test receptacles has been provided which will enable the contents of the test receptacle to be accurately weighed or tested by first varying the weight of the test receptacle so that the same will reach a predetermined standard or weight. The band is disposed around the neck of the bottle or receptacle so as not to interfere with the reading of the scale or graduations provided on the neck of the test receptacle in the usual manner.

The simplicity of my device enables the same to be manufactured at a very low cost and may easily and quickly be placed in position on the test receptacle for the purposes above set forth.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

An attachment for test receptacles of the class described comprising a band adapted to encircle the neck of the receptacle, the band being composed of malleable material to permit it to be trimmed to vary the weight, and the free ends thereof being detachably connected together, and open top pockets connected to the band at substantially diametrically opposite points, said pockets being adapted for reception of additional weight.

In testimony whereof I affix my signature.

PERRY KIER.